United States Patent
Tezuka

(10) Patent No.: US 9,855,950 B2
(45) Date of Patent: Jan. 2, 2018

(54) VEHICLE POSITION DETECTING APPARATUS

(71) Applicant: SUBARU CORPORATION, Tokyo (JP)

(72) Inventor: Shunsuke Tezuka, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/137,990

(22) Filed: Apr. 25, 2016

(65) Prior Publication Data

US 2016/0332624 A1 Nov. 17, 2016

(30) Foreign Application Priority Data

May 11, 2015 (JP) .................................. 2015-096382

(51) Int. Cl.
 *B60W 30/16* (2012.01)
 *G08G 1/123* (2006.01)
 *B60W 50/00* (2006.01)

(52) U.S. Cl.
 CPC ............. *B60W 30/16* (2013.01); *G08G 1/123* (2013.01); *B60W 2050/0078* (2013.01);
 (Continued)

(58) Field of Classification Search
 None
 See application file for complete search history.

(56) References Cited

U.S. PATENT DOCUMENTS 6,658,353 B2 * 12/2003 Shimizu .................. G01C 21/28
 340/988
2005/0010364 A1 * 1/2005 Moser .................. G01C 21/165
 701/472

(Continued)

FOREIGN PATENT DOCUMENTS

JP S58-143213 A 8/1983
JP 2008-046873 A 2/2008
 (Continued)

OTHER PUBLICATIONS

Office Action issued in corresponding Japanese Patent Application No. 2015-096386, dated Mar. 14, 2017.
 (Continued)

*Primary Examiner* — Rodney A Butler
*Assistant Examiner* — Tamara Weber
(74) *Attorney, Agent, or Firm* — McDermott Will & Emery LLP

(57) ABSTRACT

A vehicle position detecting apparatus includes: a position measurement unit that obtains first position information of a first vehicle; an autonomous sensor that obtains relative position information of a second vehicle; a receiver that receives communication data containing second position information of the second vehicle; an identification unit that performs identification on the second vehicle specified based on the relative position information and the second vehicle from which the communication data is sent; a position error calculator that calculates a position error between a position of the second vehicle specified based on the relative position information and that of the second vehicle specified based on the second position information; and a position corrector that performs, based on the position error, a correction on the position of the second vehicle specified based on the second position information, on a condition that the identified second vehicle is no longer detected by the autonomous sensor.

11 Claims, 8 Drawing Sheets

(52) U.S. Cl.
CPC . *B60W 2550/306* (2013.01); *B60W 2550/308* (2013.01); *B60W 2550/402* (2013.01); *B60W 2550/408* (2013.01); *B60W 2750/306* (2013.01)

(56) References Cited

U.S. PATENT DOCUMENTS

| | | | |
|---|---|---|---|
| 2007/0021915 A1* | 1/2007 | Breed | B60N 2/2863 |
| | | | 701/301 |
| 2007/0152804 A1* | 7/2007 | Breed | B60N 2/2863 |
| | | | 340/435 |
| 2012/0330527 A1 | 12/2012 | Kumabe et al. | |
| 2013/0093618 A1* | 4/2013 | Oh | G01S 19/41 |
| | | | 342/357.44 |

FOREIGN PATENT DOCUMENTS

| | | |
|---|---|---|
| JP | 2011-221869 A | 11/2011 |
| JP | 2013-008302 A | 1/2013 |
| JP | 2013-168019 A | 8/2013 |

OTHER PUBLICATIONS

Office Action issued in corresponding Japanese Patent Application No. 2015-096382, dated Oct. 24, 2017.

\* cited by examiner

| NO. | ITEM |
|---|---|
| 1 | DATE AND TIME OF SENDING |
| 2 | VEHICLE ID |
| 3 | LATITUDE |
| 4 | LONGITUDE |
| 5 | ALTITUDE |
| 6 | VEHICLE SPEED |
| 7 | ACCELERATION |
| 8 | STOP LAMP |

FIG. 2

| VEHICLE ID | RECEIVED POSITION INFORMATION | POSITION ERROR | AVERAGE POSITION ERROR | ERROR-RECORDED DATE AND TIME |
|---|---|---|---|---|
| V0001 | E○○○° △△′ ××.× N□□° ×× ′ △△.□ | eX=×××, eZ=△△△<br>eX=×△×, eZ=×△△<br>eX=××△, eZ=×△△<br>...<br>eX=×××, eZ=△△△ | aeX=×○×<br>aeZ=△△△ | 2015/0325/14:50:01 |
| V0002 | E○○○° □□′ ××.× N□□° ×× ′ △×.□ | ... | ... | ... |
| ... | ... | | | |
| V××××× | E○○×° □□′ ×□.× N□△° ×□′ ○△.□ | eX=△△△, eZ=×××<br>eX=△△×, eZ=××○<br>eX=△△△, eZ=×××<br>...<br>eX=△△○, eZ=×△× | aeX=△△○<br>aeZ=××× | 2015/0325/14:50:01 |

FIG. 5

VEHICLE POSITION DETECTING APPARATUS

CROSS-REFERENCE TO RELATED APPLICATIONS

The present application claims priority from Japanese Patent Application No. 2015-096382 filed on May 11, 2015, the entire contents of which are hereby incorporated by reference.

BACKGROUND

The technology relates to a vehicle position detecting apparatus that detects a position of a vehicle.

A driving support system that utilizes vehicle-to-vehicle communication may involve a decrease in accuracy of support, due to an error included in position information of another vehicle obtained by the communication. Another vehicle may be a surrounding vehicle present around an own vehicle.

To address the decrease in accuracy of support, a method has been proposed in which position information of the surrounding vehicle, obtained from a detection performed by an autonomous sensor, is used in addition to the position information obtained by the communication, without solely relying on the position information obtained by the communication. The autonomous sensor may be, for example but not limited to, a millimeter-wave radar sensor. For example, reference is made to Japanese Unexamined Patent Application Publication (JP-A) Nos. 2008-46873 and 2011-221869.

SUMMARY

In general, a proposal on a method that makes it possible to increase a detection accuracy of a position of a vehicle and thereby to improve accuracy of support has been demanded with respect to a driving support system.

It is desirable to provide a vehicle position detecting apparatus that makes it possible to increase a detection accuracy of a position of a vehicle.

An aspect of the technology provides a vehicle position detecting apparatus that includes: a position measurement unit that measures a position of a first vehicle as an own vehicle to obtain first position information as position information of the first vehicle; an autonomous sensor that detects a relative position, relative to the first vehicle, of a second vehicle to obtain relative position information of the second vehicle, in which the second vehicle is a vehicle different from the first vehicle; a receiver that receives communication data obtained by the second vehicle and sent from the second vehicle, in which the communication data contains second position information as position information of the second vehicle; an identification unit that performs identification on the second vehicle specified based on the relative position information and the second vehicle from which the communication data is sent, based on the first position information, the relative position information, and the second position information; a position error calculator that calculates, for the second vehicle identified by the identification unit, a difference, as a position error, between a position of the second vehicle specified based on the relative position information and a position of the second vehicle specified based on the second position information; and a position corrector that performs, based on the position error, a correction on the position of the second vehicle specified based on the second position information, on a condition that the second vehicle identified by the identification unit is no longer detected by the autonomous sensor.

The position corrector may average, on a time axis, the position error sequentially calculated for the second vehicle identified by the identification unit, and may perform the correction, based on the averaged position error.

The position corrector may adjust the position error, based on one of an elapse of time from and a traveling distance of the second vehicle from a time point at which the second vehicle identified by the identification unit is no longer detected by the autonomous sensor.

A driving support controller may be further included that may perform a driving support control on the first vehicle, based on the position of the second vehicle corrected by the position corrector.

The driving support controller may perform the driving support control that is based on any of control levels that are different depending on a traveling position of the second vehicle.

BRIEF DESCRIPTION OF THE DRAWINGS

FIG. 2 illustrates an example of communication data in vehicle-to-vehicle communication.

FIG. 5 describes an example of information to be recorded upon calculation of an average position error.

DETAILED DESCRIPTION

In the following, some implementations of the technology are described in detail with reference to the accompanying drawings.

1. Overall Configuration of Vehicle Controller

Figure 1:
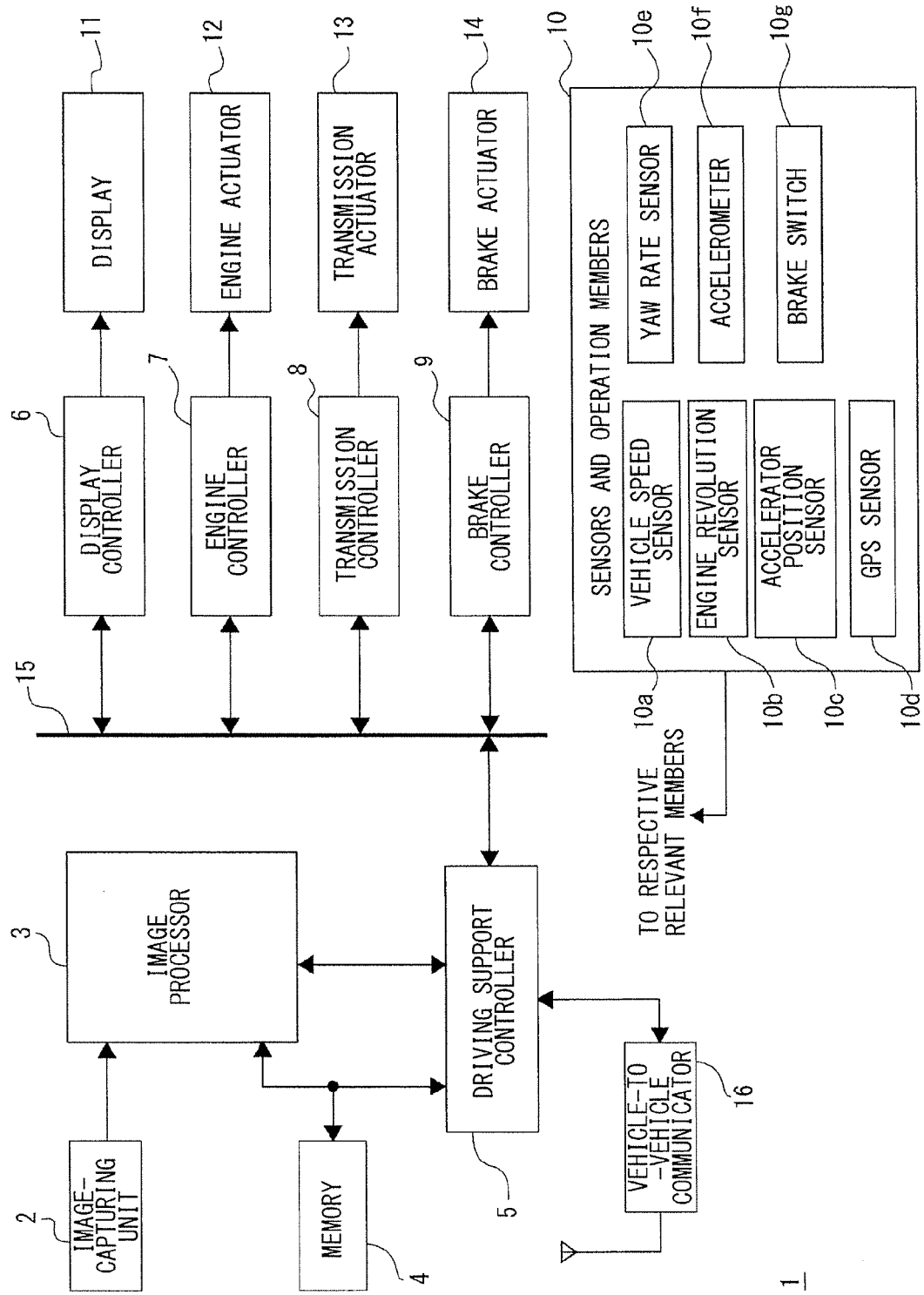
FIG. 1 is a block diagram illustrating an outline of a configuration of a vehicle controller that includes a vehicle position detecting apparatus according to an implementation.

FIG. 1 is a block diagram illustrating an outline of a configuration of a vehicle controller 1 that includes a vehicle position detecting apparatus according to an implementation of the technology. Note that FIG. 1 primarily illustrates a configuration of a key part, directed to the implementation of the technology, of the configuration of the vehicle controller 1.

Referring to FIG. 1, the vehicle controller 1 may include an image-capturing unit 2, an image processor 3, a memory 4, a driving support controller 5, a display controller 6, an engine controller 7, a transmission controller 8, a brake controller 9, sensors and operation members 10, a display 11, an engine actuator 12, a transmission actuator 13, a brake actuator 14, a bus 15, and a vehicle-to-vehicle communicator 16, all of which may be provided in an own vehicle.

The image processor 3 may be configured by a microcomputer that includes, for example but not limited to, a central processing unit (CPU), a read-only memory (ROM), and a random access memory (RAM). The image processor 3 may execute, based on captured image data, predetermined image processes related to recognition of an environment outside the own vehicle. The captured image data may be obtained as a result of capturing, by the image-capturing unit 2, an image in a traveling direction of the own vehicle. The traveling direction may be a forward direction in this implementation without limitation. The image processes performed by the image processor 3 may utilize the memory 4. The memory 4 may be, for example but not limited to, a nonvolatile memory.

The image-capturing unit 2 may include two cameras. Each of the cameras may include a camera optical system and an imaging device. The imaging device may be, for example but not limited to, a charge-coupled device (CCD), a complementary metal oxide semiconductor (CMOS), or any other suitable device that allows for imaging. Each of the cameras may cause an image of an object to be formed on an imaging plane of the imaging device by corresponding one of the camera optical systems, and thereby allow an electric signal that corresponds to an amount of received light to be obtained on a pixel basis.

The cameras may be so disposed as to allow ranging based on a so-called stereo image capturing method to be performed. The electric signal obtained by each of the cameras may be subjected to an analog-to-digital (A/D) conversion and a predetermined correction. The signal having been subjected to the A/D conversion and the predetermined correction may be supplied to the image processor 3 as a digital image signal (i.e., the captured image data) that indicates a luminance value on a pixel basis. The luminance value may be represented by any of predetermined number of gradation values.

The image processor 3 may execute various image processes to obtain forward information, and estimate, based on the obtained forward information and any other data, a traveling course of the own vehicle. The various image processes may be based on each of the pieces of captured image data obtained by the stereo image capturing. The forward information may include, for example but not limited to, three-dimensional object data and lane line data which are located ahead of the own vehicle. Further, the image processor 3 may detect a preceding vehicle that travels on the traveling course of the own vehicle, based on the obtained forward information including the three-dimensional object data.

In one specific but non-limiting example, the image processor 3 may perform the following example processes, as the processes that are based on each of the pieces of captured image data obtained by the stereo image capturing. First, the image processor 3 may generate distance information. The distance information may be generated based on the principle of triangulation that utilizes a shift amount (i.e., a parallax) between corresponding positions in respective captured images, namely, a pair of captured images as the pieces captured image data. Further, the image processor 3 may perform a known grouping process on the distance information, and may compare the distance information having been subjected to the grouping process with three-dimensional road shape data, three-dimensional object data, etc., which are stored in advance. By making the comparison, the image processor 3 may extract data including, without limitation, the data on lane line, data on sidewall present along a road such as a guardrail and a curb, and the data on three-dimensional object such as a vehicle. Based on the extracted data including the lane line data and the sidewall data, the image processor 3 may further estimate the traveling course of the own vehicle, and extract or detect, as a surrounding vehicle that moves in the same direction, any three-dimensional object that is present on the traveling course of the own vehicle (including the driving lane on which the own vehicle travels and any driving lane adjacent thereto in a case where the road has multiple lanes per side) and moves at a predetermined speed in a direction substantially the same as a direction of the own vehicle. Hereinafter, the surrounding vehicle that moves in the same direction may be simply referred to as a "same direction surrounding vehicle". The predetermined speed here may be, for example but not limited to, 0 (zero) Km/h or greater. When the same direction surrounding vehicle is detected, the image processor 3 may calculate a relative distance cd, a relative speed ds, a surrounding vehicle speed ss, and surrounding vehicle acceleration sac, as vehicle information of that same direction surrounding vehicle. The relative distance cd may be equal to a distance between the own vehicle and the same direction surrounding vehicle. The relative speed ds may be equal to a rate of change of the relative distance cd. The surrounding vehicle speed ss may be defined as the sum of the relative speed ds and an own vehicle speed js, where the own vehicle speed js may be a traveling speed of the own vehicle detected by a later-described vehicle speed sensor 10a. The surrounding vehicle acceleration sac may be equal to a differential value of the surrounding vehicle speed ss. The image processor 3 may recognize, out of the same direction surrounding vehicles, any surrounding vehicle that is present on the driving lane on which the own vehicle travels as the preceding vehicle. The image processor 3 may also recognize, out of the same direction surrounding vehicles, any surrounding vehicle that involves, in particular, the surrounding vehicle speed ss which is equal to or less than a predetermined value (for example but not limited to, 4 Km/h or less) and does not accelerate as a substantially-stopped surrounding vehicle.

For example, the image processor 3 may obtain the foregoing vehicle information on the surrounding vehicle for each frame of each of the pieces of captured image data. The image processor 3 may cause the memory 4 to store or hold the obtained vehicle information sequentially.

The foregoing process of detecting the surrounding vehicle (or the same direction surrounding vehicle) performed by the image processor 3 is, in other words, a process of detecting a relative position, relative to the own vehicle, of any surrounding vehicle present around the own vehicle. The image-capturing unit 2 and the image processor 3 which are provided to perform such a process of detecting the surrounding vehicle may constitute a non-limiting example of an "autonomous sensor" that autonomously detects the relative position of the surrounding vehicle present around the own vehicle.

The driving support controller 5 may be configured by a microcomputer that includes, for example but not limited to, CPU, ROM, and RAM. The driving support controller 5 may execute various control processes related to driving support, based on a result of the image processes performed by the image processor 3 and held in the memory 4, and based on information on detection, operation input, etc., obtained by the sensors and operation members 10. The driving support controller 5 may be coupled to the display controller 6, the engine controller 7, the transmission controller 8, and the brake controller 9 through the bus 15, and adapted to perform data communication mutually between those controllers each of which may be configured by a microcomputer as well. The driving support controller 5 may instruct any necessary controller among the foregoing controllers to execute an operation related to the driving support.

Specific but non-limiting examples of the driving support may include an adaptive cruise control (ACC) and pre-crash brake control. In the ACC, a target vehicle speed St and a target inter-vehicle distance Dt may be set based on an operation input performed through a predetermined operation member provided among the sensors and operation members 10. The driving support controller 5 may perform, as the ACC, a constant speed travel control that causes the own vehicle speed js to meet the target vehicle speed St when the preceding vehicle is not detected. When the preceding vehicle is detected, the driving support controller 5 may perform, as the ACC, a follow-up travel control that causes the relative distance cd between the own vehicle and that preceding vehicle to meet the target inter-vehicle distance Dt. The follow-up travel control may include a follow-up stop control and a follow-up start control as well.

As the pre-crash brake control, the driving support controller 5 may perform a predetermined vehicle control when a determination is made that the own vehicle may possibly collide against a predetermined obstacle on the condition that the obstacle has been detected. The obstacle may be, for example but not limited to, a vehicle present ahead of the own vehicle including the preceding vehicle. The predetermined vehicle control may be, for example but not limited to, providing a driver with an alert or providing a supplemental brake. The determination as to whether the own vehicle may possibly collide against the obstacle may be performed based on information on a distance from the own vehicle to the obstacle calculated by the image processor 3.

The driving support controller 5 may be coupled to the vehicle-to-vehicle communicator 16. The vehicle-to-vehicle communicator 16 may exchange data between the own vehicle and the surrounding vehicle present around the own vehicle, by means of a communication system that complies with a predetermined vehicle-to-vehicle communication standard. The vehicle-to-vehicle communication is not limited to direct communication between the vehicles. The vehicle-to-vehicle communication may include communication that involves a relay such as, but not limited to, a base station.

FIG. 2 illustrates an example of communication data to be exchanged between the own vehicle and the surrounding vehicle by the vehicle-to-vehicle communicator 16. The communication data in an illustrated example may contain, without limitation: date and time of sending the communication data; a vehicle identification (ID) that uniquely identifies a vehicle from which the communication data is sent; position information on latitude, longitude, and altitude measured by the vehicle from which the communication data is sent; and various pieces of information on a vehicle speed, acceleration, and a stop lamp of the vehicle from which the communication data is sent. The information on the acceleration may at least contain information on acceleration that acts in a direction parallel to a traveling direction of the vehicle from which the communication data is sent. The information on the stop lamp may be, for example but not limited to, information that indicates on and off of the stop lamp provided on the vehicle from which the communication data is sent.

Referring to FIG. 1, the driving support controller 5 may also perform, as described later in greater detail, a driving support control that is based on communication data received from the surrounding vehicle by the vehicle-to-vehicle communicator 16.

The sensors and operation members 10 may generically encompass various sensors and operation members which are provided in the own vehicle. Non-limiting examples of the sensors included as the sensors and operation members 10 may include: the vehicle speed sensor 10a that detects a speed of the own vehicle as the own vehicle speed js; an engine revolution sensor 10b that detects the number of revolutions of an engine; an accelerator position sensor 10c that detects an accelerator position from an amount of pressing down on an accelerator pedal; a GPS sensor 10d that measures a position that is based on latitude, longitude, and altitude; a yaw rate sensor 10e that detects a yaw rate; an accelerometer (G-sensor) 10f that detects acceleration; and a brake switch 10g that may be turned on and off in response to operation and non-operation of the brake pedal.

As used herein, the term "GPS" is not limited to "Global Positioning System" currently operated in the United States, and is intended to refer to a global navigation satellite system (GNSS) as a "satellite positioning system" in general.

The sensors and operation members 10 may also include any other unillustrated sensor such as, but not limited to: a mass flow sensor that detects an amount of intake air to be supplied to an engine; a throttle position sensor that detects a position of a throttle valve which is inserted in an intake passage and which adjusts an amount of intake air to be supplied to each cylinder of the engine; a water temperature sensor that detects a temperature of cooling water which indicates a temperature of the engine; and an ambient temperature sensor that detects a temperature outside the vehicle.

Non-limiting examples of the operation members may include: an ignition switch that provides instructions on starting and stopping of the engine; an operation member that performs the operation related to the foregoing ACC; a shift lever that provides instructions on a selection of an automatic shift mode and a manual shift mode and on a shift up and a shift down upon the manual shift mode in an automatic transmission; and a display changeover switch that switches one display information to another to be displayed on a multi function display (MFD) provided on the display 11.

The display 11 may generically encompass various meters, the MFD, and any other display device that presents information to a driver. The meters may be, for example but not limited to, a speed meter and a tachometer provided in a meter panel disposed in front of the driver. The MFD may display various pieces of information together or by switching one information to another. The various pieces of information may include, for example but not limited to, information on mileage of the own vehicle, information on an ambient temperature, and information on instantaneous fuel consumption.

The display controller 6 may control a display operation to be performed by the display 11, based on, for example but not limited to, a detection signal and information on operation input supplied respectively from a predetermined sensor and an operation member in the sensors and operation members 10. For example, the display controller 6 may display predetermined information on the display 11 as a part of the driving support, based on instructions given from the driving support controller 5. The predetermined information may be, for example but not limited to, an alerting message that may be displayed on a predetermined region in the MFD.

The engine controller 7 may control various actuators that are provided as the engine actuator 12, based on, for example but not limited to, the detection signal and the information on operation input supplied respectively from a predetermined sensor and an operation member in the sensors and operation members 10. The engine actuator 12 may include various actuators that are related to an engine drive such as, but not limited to, a throttle actuator that drives a throttle valve and an injector that injects a fuel.

For example, the engine controller 7 may perform a start and stop control of the engine in accordance with an operation of the foregoing ignition switch. The engine controller 7 may also control, for example but not limited to, fuel injection timing, a pulse width directed to the fuel injection, and a throttle position, based on the detection signals obtained from predetermined sensors such as, but not limited to, the engine revolution sensor 10b and the accelerator position sensor 10c. Upon performing the ACC, the engine controller 7 may determine a target throttle position from a map, etc., based on instructions given from the driving support controller 5, and may control the throttle actuator, i.e., controls an output of the engine, based on the determined throttle position.

The transmission controller 8 may control various actuators that are provided as the transmission actuator 13, based on, for example but not limited to, the detection signal and the information on operation input supplied respectively from a predetermined sensor and an operation member in the sensors and operation members 10. The transmission actuator 13 may include, for example but not limited to, an actuator that performs a shift control of the automatic transmission.

For example, the transmission controller 8 may output a shift signal to the foregoing actuator in accordance with a predetermined shift pattern to perform the shift control, when the automatic shift mode has been selected by the foregoing shift lever. When the manual shift mode has been set, the transmission controller 8 may output a shift signal, which follows instructions on the shift up or the shift down given through the shift lever, to the foregoing actuator to perform the shift control.

The brake controller 9 may control various actuators that are provided as the brake actuator 14, based on, for example but not limited to, the detection signal and the information on operation input supplied respectively from a predetermined sensor and an operation member in the sensors and operation members 10. The brake actuator 14 may include various actuators that are related to braking such as, but not limited to, fluid pressure control actuators that control an output fluid pressure to be outputted from a brake booster to a master cylinder and a fluid pressure inside a brake fluid pipe.

For example, the brake controller 9 may control, based on fluid pressure instruction information outputted from the driving support controller 5, the foregoing fluid pressure control actuators to perform braking of the own vehicle. The brake controller 9 may also calculate a slip rate of any wheel from detection information obtained from a predetermined sensor such as, but not limited to, an axle rotation speed sensor and the vehicle speed sensor 10a. Further, based on the slip rate, the brake controller 9 may increase or decrease the fluid pressure by any of the foregoing fluid pressure control actuators to achieve a so-called antilock brake system (ABS) control.

[Position Detection of Surrounding Vehicle and Driving Support Control According to Implementation]

Figure 3:
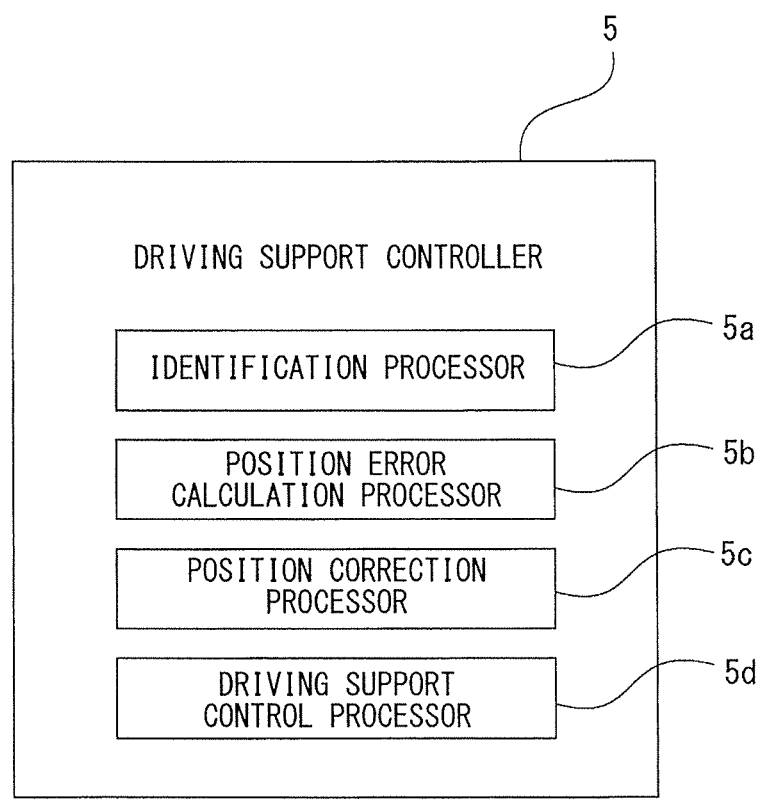
FIG. 3 is a functional block diagram that describes a position detection of a surrounding vehicle and a driving support control according to the implementation.

FIG. 3 is a functional block diagram that describes a position detection of the surrounding vehicle and the driving support control according to the implementation. In FIG. 3, processes to be executed by the driving support controller 5 are divided by function to illustrate the processes in blocks.

Referring to FIG. 3, the driving support controller 5 may include an identification processor 5a, a position error calculation processor 5b, a position correction processor 5c, and a driving support control processor 5d.

The identification processor 5a performs identification on the surrounding vehicle detected by the image processor 3 and the surrounding vehicle from which the vehicle-to-vehicle communication data is sent, based on information on the position of the own vehicle measured by the GPS sensor 10d, information on the relative position, relative to the own vehicle, of the surrounding vehicle (the same direction surrounding vehicle) detected by the image processor 3 through the foregoing detection process, and position information received from the surrounding vehicle by the vehicle-to-vehicle communicator 16.

Hereinafter, the same direction surrounding vehicle detected by the image processor 3 through the foregoing detection process may be referred to as a "surrounding vehicle detected by the autonomous sensor".

Figure 4:
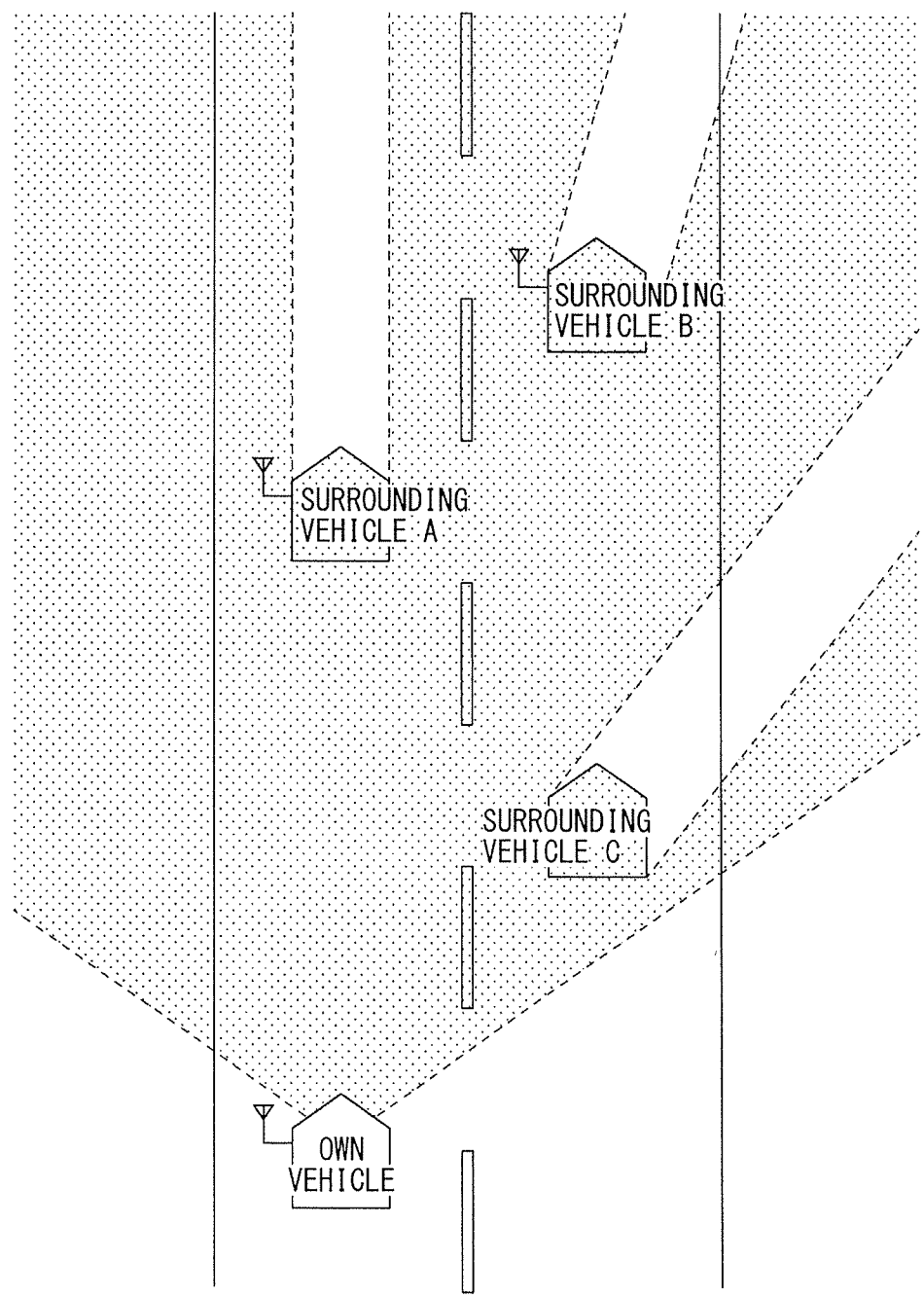
FIG. 4 describes an example of identifying the surrounding vehicles.

FIG. 4 describes an example of identifying surrounding vehicles. In the drawing, a part having a satin pattern schematically denotes a region in which the same direction surrounding vehicle is detectable by the image processor 3.

FIG. 4 illustrates an example in which, as the same direction surrounding vehicles around the own vehicle, a surrounding vehicle A is present on the same driving lane as a driving lane on which the own vehicle travels, and surrounding vehicles B and C are present on a driving lane adjacent to the driving lane on which the own vehicle travels. The surrounding vehicles A and B each have a vehicle-to-vehicle communication function, whereas the surrounding vehicle C has no vehicle-to-vehicle communication function.

In this case, the position information obtained by the vehicle-to-vehicle communication is the position information that belongs to the surrounding vehicle A and the position information that belongs to the surrounding vehicle B, excluding the surrounding vehicle C. Hence, the identification is performed only on the surrounding vehicle A and the surrounding vehicle B.

In the example illustrated in FIG. 4, no interrupting object is present among the surrounding vehicles A, B, and C as seen from the own vehicle. Hence, the image processor 3 may possibly detect that all of the surrounding vehicles A, B, and C are the same direction surrounding vehicle. In this case, the surrounding vehicle C may possibly be identified as the surrounding vehicle A or the surrounding vehicle B erroneously. In particular, an error may possibly occur in the position information measured by each of the surrounding vehicles A and B, meaning that erroneous identification may possibly be carried out if the received pieces of position information themselves are used as a reference. More specifically, in this case, such an error in measurement of the position information may result in identification in which the surrounding vehicle A is identified erroneously as the surrounding vehicle B, or identification in which the surrounding vehicle B is identified erroneously as the surrounding vehicle C.

In consideration of the error included in the position information obtained from the surrounding vehicle, the identification processor 5a performs identification based on the surrounding vehicle detected by the autonomous sensor, for the surrounding vehicle from which the communication data is sent. A specific but non-limiting example of a method of performing such identification may be a method in which an amount of change of a speed per unit time may be calculated for each of a surrounding vehicle detected by an autonomous sensor and a surrounding vehicle from which communication data is received, and the surrounding vehicles between which a difference in the amount of change of the speed is within a certain rate are identified as the same vehicle.

The identification that takes into consideration the error included in the position information received from the surrounding vehicle is not limited to the foregoing method. Any other method is adoptable for the identification. For example, identification may be performed on the condition that a difference between a position based on position information and a position detected by an autonomous sensor falls within a predetermined threshold range, and the threshold is set based on a measurement error that occurs for each communication vehicle.

The position error calculation processor 5b calculates, for the surrounding vehicle identified by the identification processor 5a, a difference between a position of that surrounding vehicle specified based on the information on the relative position detected by the image processor 3 and a position of the surrounding vehicle specified based on the position information received by the vehicle-to-vehicle communication. The position error calculation processor 5b calculates the difference as a position error $\Delta P$.

In the implementation, the position error $\Delta P$ may be determined as a value that uses a relative position as a reference, not as a value that uses an absolute position based on latitude and longitude as a reference. More specifically, the term "relative position" as used herein refers to a position on a two-dimensional plane defined by an axis parallel to a traveling direction of the own vehicle (referred to as a "Z axis" hereinafter) and an axis parallel to a lateral direction of the own vehicle (referred to as an "X axis" hereinafter), where a position of the own vehicle is the origin.

The position error calculation processor 5b in the implementation may first convert the position information, received by the vehicle-to-vehicle communication from the surrounding vehicle having been identified by the identification processor 5a, into the relative position. Then, the position error calculation processor 5b may calculate, as the position error $\Delta P$, the difference between the converted relative position and the relative position detected by the image processor 3 with respect to that surrounding vehicle.

The position error $\Delta P$ may also be determined as a value that uses an absolute position as a reference, by converting the relative position, detected by the image processor 3 for the surrounding vehicle, into the absolute position.

Further, the position of the surrounding vehicle may be determined based on a position in three-dimensional space that includes altitude. This makes it possible to calculate the position error $\Delta P$ as three-dimensional data that includes the altitude.

The position error calculation processor 5b may sequentially execute the foregoing process of calculating the position error $\Delta P$, each time the identification is performed by the identification processor 5a. In other words, the position error $\Delta P$ may be sequentially calculated on a time axis for the identified surrounding vehicle while that identified surrounding vehicle is detected by the image processor 3.

The position correction processor 5c performs a correction, on a condition that the surrounding vehicle identified by the identification processor 5a is no longer detected by the autonomous sensor, on the position of that surrounding vehicle specified based on the position information received through the vehicle-to-vehicle communication. The position correction processor 5c performs the correction on the position of that surrounding vehicle, based on the position error $\Delta P$ calculated by the position error calculation processor 5b.

The position error $\Delta P$ may contain, for example but not limited to, the various error components as described below:
(1) an error determined by a position at which a GPS antenna is mounted in each vehicle;
(2) an error due to characteristics of a GPS receiver;
(3) an error due to an insufficient accuracy of GPS measurement;
(4) an error in quantization upon transmission through the vehicle-to-vehicle communication; and
(5) an error due to insufficient detection accuracy of the autonomous sensor.

The foregoing error component (1) may be attributed to circumstances where, for example but not limited to, the autonomous sensor performs a relative position detection that uses a rear end position of a surrounding vehicle as a reference, whereas the position at which the GPS antenna is mounted is located at a position of the surrounding vehicle other than the rear end. The error component (1) is thus not an error component that varies from moment to moment while driving but is an error component that is characteristic of that vehicle.

The error component (2) may be an error component attributed to a measurement logic in the GPS receiver. For example, the error component (2) may be attributed to a determination as to which of the signals belonging to respective multiple GPS satellites should be processed with greater emphasis. The error component (2) may be thus an error component that is characteristic of a type of each GPS receiver.

The error components other than the error components (1) and (2) may vary easily from moment to moment while driving and thus may be sort of a noise-like error component.

The position error $\Delta P$ may not be able to properly reflect an error that is characteristic of a vehicle, under a situation where any noise-like error component other than the error components (1) and (2) is included.

To address this concern, the position correction processor 5c may perform averaging of values of the position error $\Delta P$ sequentially calculated on the time axis to remove any error component other than the error components (1) and (2). In other words, the position correction processor 5c may cause only a component to be extracted that indicates the error that is characteristic of the vehicle.

In the following, the thus-averaged position error $\Delta P$ is referred to as an "average position error a$\Delta P$".

Referring to FIG. 5, a description is given of a method of calculating the average position error a$\Delta P$ with respect to the identified surrounding vehicle. FIG. 5 illustrates an example of information to be recorded into the RAM of the driving support controller 5 upon the calculation of the average position error a$\Delta P$.

First, upon receiving through the vehicle-to-vehicle communication the communication data from the surrounding vehicle, the driving support controller 5 may associate the vehicle ID with the position information (denoted as "received position information" in the drawing) both included in the received communication data, and record the associated vehicle ID and the position information into the RAM. In the implementation, the position information may be overwritten each time the position information is received. Upon recording the position information, the received information on the absolute position itself may be recorded as the position information, or the absolute position may be converted into the relative position and the converted position information may be recorded as the position information.

Following the identification of the surrounding vehicle from which the communication data is received and the calculation of the position error $\Delta P$ of that surrounding vehicle, the driving support controller 5 may associate the calculated position error $\Delta P$ with the vehicle ID of that surrounding vehicle, and record the associated position error $\Delta P$ and the vehicle ID into the RAM. The position error $\Delta P$ may be sequentially calculated each time the position information is received while the surrounding vehicle is detected by the autonomous sensor, i.e., while the surrounding vehicle is identified. Surrounding vehicles with the vehicle IDs from "V0001" to "Vxxxx" in the drawing are the identified surrounding vehicles following the detection by the autonomous sensor. For each of those identified surrounding vehicles, the sequentially-calculated position errors $\Delta P$ are recorded over a past predetermined time period.

Note that the surrounding vehicle with the vehicle ID "V0002" is a surrounding vehicle from, which the communication data is received but undetected by the autonomous sensor. For such a surrounding vehicle, only the vehicle ID and the received position information are recorded.

The driving support controller 5, i.e., the position correction processor 5c, may perform the averaging of the position errors $\Delta P$ thus accumulated in the RAM to calculate the average position error a$\Delta P$. In this implementation, without limitation, each time a new position error $\Delta P$ is calculated, the position errors $\Delta P$, calculated within a certain past time period from a time point at which the new position error $\Delta P$ is calculated, may be averaged to calculate the average position error a$\Delta P$ sequentially. The averaging may be performed based on, for example but not limited to, arithmetic averaging of positions in both the X axis direction and the Z axis direction. The driving support controller 5, i.e., the position correction processor 5c, may associate the thus sequentially-calculated average position error a$\Delta P$ with the vehicle ID, and record the associated average position error a$\Delta P$ and the vehicle ID into the RAM. In this implementation, without limitation, the average position error a$\Delta P$ may be overwritten each time the average position error a$\Delta P$ is calculated.

Further, in response to the calculation of the average position error a$\Delta P$, the driving support controller 5, i.e., the position correction processor 5c, may associate information that indicates the recorded date and time of that calculated average position error a$\Delta P$ with the vehicle ID, and record the associated information on the recorded date and time and the vehicle ID into the RAM (denoted as "error-recorded date and time" in the drawing). In this implementation, without limitation, the information on the error-recorded date and time may also be sequentially overwritten.

The position correction processor 5c may perform the correction of the position of the surrounding vehicle specified based on the received position information. The position correction processor 5c may perform the correction, based on the average position error a$\Delta P$ thus held in the RAM.

Note that the average position error a$\Delta P$ to be used for the correction may possibly involve a decrease in reliability due to an elapse of time from a time point at which a target surrounding vehicle is determined as being no longer detected. One reason is that characteristics of the position error that occurs in the position information obtained from the surrounding vehicle may possibly change in response to a change in traveling environment associated with an elapse of time. The change in traveling environment may include, for example but not limited to, a change in acquisition of a GPS satellite.

To address this concern, the position correction processor 5c may adjust a value of the average position error a$\Delta P$ to be used for the correction, based on the elapse of time from the time point at which the target surrounding vehicle is no longer detected. In one specific but non-limiting example, the position correction processor 5c according to the implementation may adjust the value of the average position error a$\Delta P$ to be used for the correction, based on an elapse of time from the recorded date and time (the error-recorded date and time) of that average position error a$\Delta P$ held in the RAM. The adjustment may be performed by, for example but not limited to, multiplying the value of the average position error a$\Delta P$ by a coefficient that corresponds to the elapse of time from the error-recorded date and time. The coefficient may be so determined that a degree of the correction is weakened with an increase in length of the elapse of time. In this implementation, without limitation, a maximum value of the coefficient may be "1", and an amount of the adjustment may be "0" depending on the elapse of time.

The driving support control processor 5d may perform the driving support control on the own vehicle, based on the position of the surrounding vehicle corrected by the position correction processor 5c.

In this implementation, without limitation, a support control directed to danger avoidance may be performed as the driving support control. The danger avoidance may be directed to a situation where a suddenly-decelerating vehicle is detected ahead of the own vehicle. In one specific but non-limiting example, the driving support control processor 5d may determine the presence of the suddenly-decelerating vehicle, based on the information on acceleration included in the communication data received by the vehicle-to-vehicle communication. As the driving support control in this case, a support control may be performed that is based on any of control levels that are different depending on whether the suddenly-decelerating vehicle is present on the same driving lane as a driving lane on which the own vehicle travels. Upon performing the support control, the information on the position of the surrounding vehicle corrected by the position correction processor 5c may be used.

When the suddenly-decelerating vehicle is present on the same driving lane as the driving lane on which the own vehicle travels, the driving support control processor 5d may alert a driver. In one specific but non-limiting example, the driving support control processor 5d may display alerting information for the danger avoidance, including textual information such as "ATTENTION: VEHICLE AHEAD DECELERATING SUDDENLY", on the MFD of the display 11. When the suddenly-decelerating vehicle is present on a driving lane different from the driving lane on which the own vehicle travels, the driving support control processor 5d may provide the driver with information notifying the driver of the presence of the suddenly-decelerating vehicle at another driving lane. In one specific but non-limiting example, the driving support control processor 5d may display textual information such as "VEHICLE ON OTHER LANE DECELERATING SUDDENLY", or any information other than the textual information, on the MFD of the display 11.

The foregoing alerting information and the provision of information are not limited to those presented to the driver in a visual way. The presentation of the foregoing alerting information and the provision of information may also be performed in an auditory way.

Figure 6:
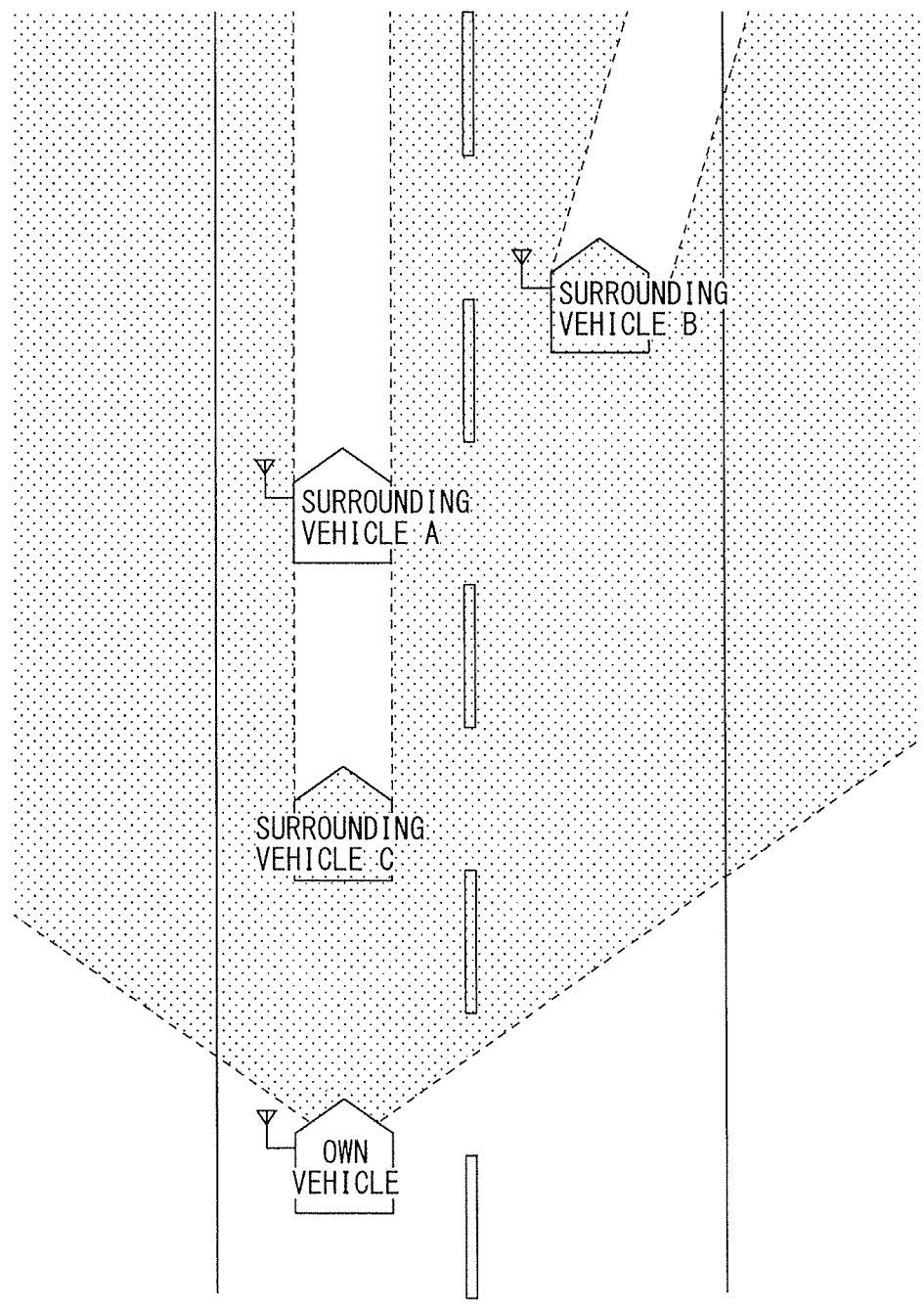
FIG. 6 describes a significance of performing a position correction.

A description is given now of a significance of performing the position correction in a driving support control such as that described above. For example, in the foregoing situation illustrated in FIG. 4, the surrounding vehicle A present on the same driving lane as the driving lane on which the own vehicle travels is detected by the autonomous sensor, making it possible to perform the proper driving support, based on the information on the relative position detected by the autonomous sensor. However, if the surrounding vehicle C makes a lane change to the driving lane on which the own vehicle travels as illustrated in FIG. 6 from the situation illustrated in FIG. 4, the surrounding vehicle A will be located at a blind spot of the autonomous sensor, meaning that the detection has to be rely on the communication data obtained by the vehicle-to-vehicle communication for the position of the surrounding vehicle A. Under such circumstances, handling the position of the surrounding vehicle A based solely on the communication data may possibly lead to an erroneous determination as to whether the surrounding vehicle A is present on the same driving lane as the driving lane on which the own vehicle travels. This may in turn prevent the driving support that is based on the appropriate control level from being performed when the surrounding vehicle A has decelerated suddenly. In contrast, the implementation that performs the foregoing position correction that reflects the position errors allows for appropriate handling of the position even when the suddenly-decelerating vehicle, i.e., the surrounding vehicle A, is located at the blind spot, making it possible to perform the driving support that is based on the appropriate control level.

3. Procedure of Processes

Figure 7:
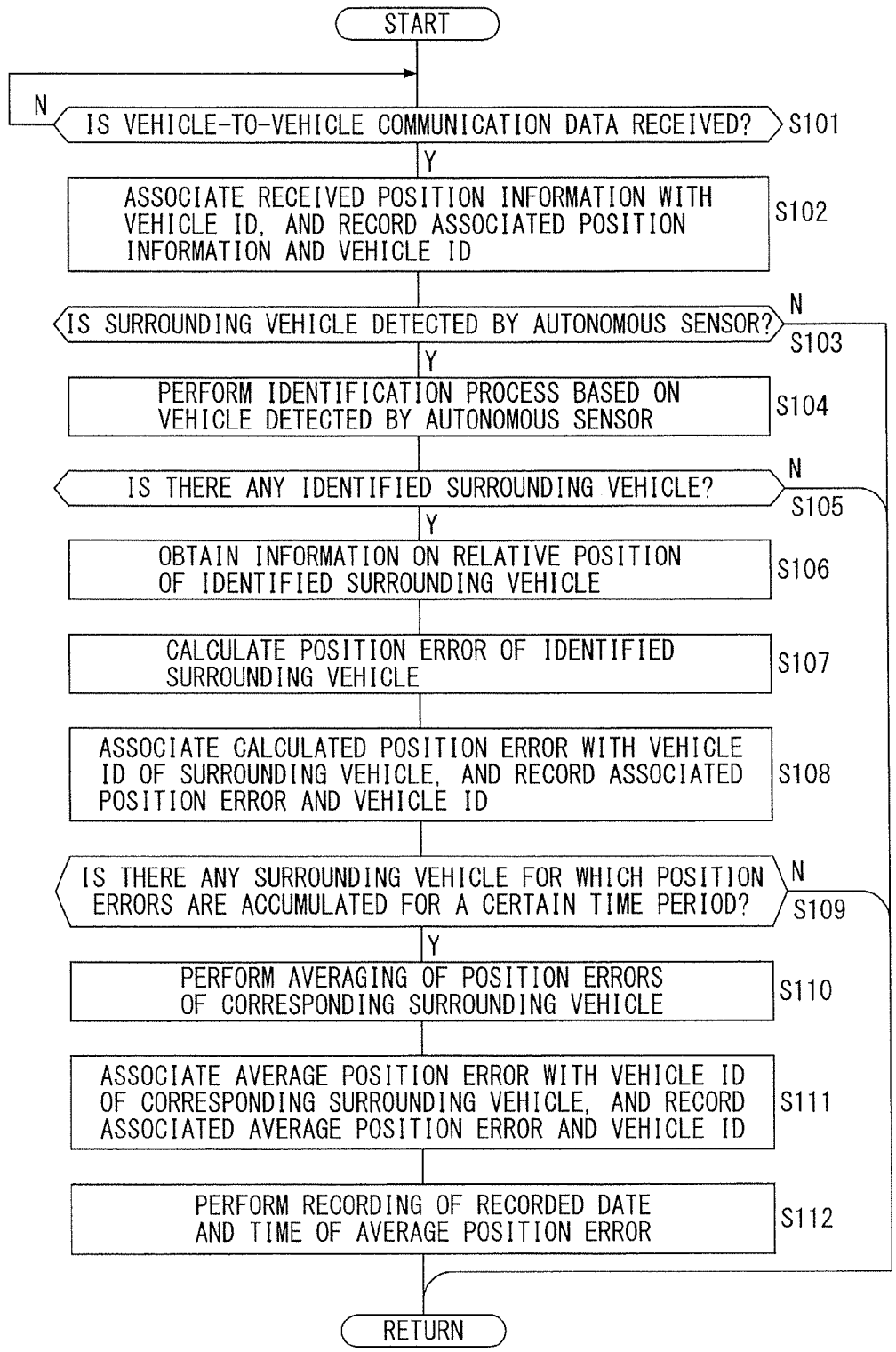
FIG. 7 is a flowchart illustrating a procedure of processes that relate to the calculation and the recording of the average position error.
Figure 8:
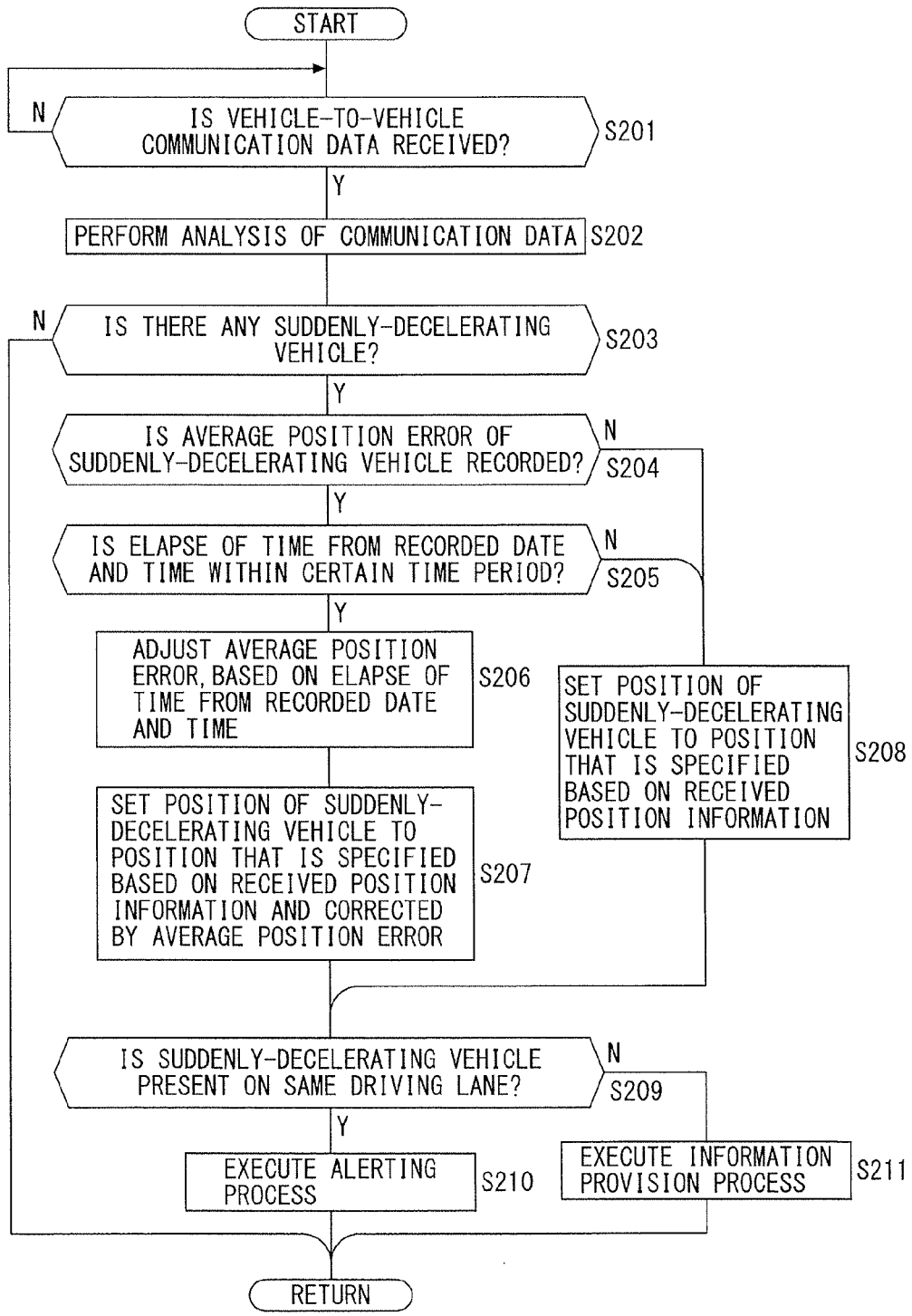
FIG. 8 is a flowchart illustrating a procedure of processes that relate to the correction of a position of the surrounding vehicle and the driving support control.

A description is given, with reference to flow charts illustrated in FIGS. 7 and 8, of an example of a procedure of processes to be performed to achieve the position detection of the surrounding vehicle and the driving support control according to the foregoing implementation.

The processes illustrated in FIGS. 7 and 8 may be executed by the CPU of the driving support controller 5 in accordance with programs stored in the ROM without limitation.

FIG. 7 illustrates a procedure of processes that relate to the calculation and the recording of the average position error a$\Delta$P.

Referring to FIG. 7, in step S101, the driving support controller 5 may wait until the vehicle-to-vehicle communication data is received. In step S102, upon receiving the vehicle-to-vehicle communication data, the driving support controller 5 may associate the received position information with the vehicle ID, and record the associated position information and the vehicle ID into the RAM.

In subsequent step S103, the driving support controller 5 may make a determination as to whether a surrounding vehicle is detected by the autonomous sensor. In other words, the driving support controller 5 may make a determination as to whether the same direction surrounding vehicle is detected by the image processor 3.

A flow of the processes may return to step S101 (proceeds to "RETURN" in the drawing) when a determination is made that the surrounding vehicle is not detected. In other words, the driving support controller 5 may only associate the received position information with the vehicle ID to record the associated position information and the vehicle ID into the RAM, when the surrounding vehicle is not detected by the autonomous sensor.

When a determination is made that the surrounding vehicle is detected by the autonomous sensor, the flow of the processes may proceed to step S104. In the step S104, the driving support controller 5 may perform the identification process based on the vehicle detected by the autonomous sensor. In other words, the driving support controller 5 may perform the identification process based on the same direction surrounding vehicle detected by the image processor 3, for the surrounding vehicle from which the communication data is received. A method of the identification process has been already described above and will not be described in detail to prevent any duplicate description.

In subsequent step S105, the driving support controller 5 may make a determination as to whether there is any identified surrounding vehicle. In other words, the driving support controller 5 may make a determination as to, with respect to the surrounding vehicle from which the position information is received, whether there is a surrounding vehicle that corresponds in position to the vehicle detected by the autonomous sensor as a result of performing the identification process in the step S104.

A flow of the processes may return to the step S101 when a determination is made that there is no identified surrounding vehicle.

When a determination is made that there is the identified surrounding vehicle, the flow of the processes may proceed to step S106. In the step S106, the driving support controller 5 may obtain the information on the relative position of the identified surrounding vehicle. In subsequent step S107, the driving support controller 5 may calculate the position error $\Delta$P of the identified surrounding vehicle. In this implementation, without limitation, the position error $\Delta$P that uses the relative position as a reference may be calculated as described above. Hence, the driving support controller 5 may convert the position information, received from the surrounding vehicle and recorded in the RAM, into the information on the relative position, and may then calculate the position error $\Delta$P.

In step S108, following the calculation of the position error $\Delta$P in the step S107, the driving support controller 5 may associate the calculated position error $\Delta$P with the vehicle ID of the surrounding vehicle and record the associated position error $\Delta$P and the vehicle ID into the RAM.

In subsequent step S109, the driving support controller 5 may make a determination as to whether there is any surrounding vehicle for which the position errors $\Delta$P are accumulated for a certain time period. The flow of the processes may return to the step S101 when a determination is made that there is no surrounding vehicle for which the position errors $\Delta$P are accumulated for the certain time period.

When a determination is made that there is the surrounding vehicle for which the position errors $\Delta$P are accumulated for the certain time period, the flow of the processes may proceed to step S110. In the step S110, the driving support controller 5 may perform the averaging of the position errors $\Delta$P of the corresponding surrounding vehicle. In subsequent step S111, the driving support controller 5 may associate the average position error a$\Delta$P with the vehicle ID of the corresponding surrounding vehicle, and record the associated average position error a∆P and the vehicle ID into the RAM.

In subsequent step S112, the driving support controller 5 may record the recorded date and time of the average position error a∆P into the RAM. The flow of the processes may then return to the step S101.

FIG. 8 illustrates a procedure of processes that relate to the correction of the position of the surrounding vehicle and the driving support control.

Referring to FIG. 8, in step S201, the driving support controller 5 may wait until the vehicle-to-vehicle communication data is received. In step S202, upon receiving the vehicle-to-vehicle communication data, the driving support controller 5 may perform an analysis of the communication data. The analysis performed here may be, for example but not limited to, an analysis that is necessary at least to make a determination on the presence of the suddenly-decelerating vehicle. In one specific but non-limiting example, the driving support controller 5 may perform, for each surrounding vehicle from which the communication data is received, a process of determining a relationship in magnitude between a value of the acceleration included in the communication data and a predetermined threshold.

In subsequent step S203, the driving support controller 5 may make a determination on the presence of the suddenly-decelerating vehicle. A flow of the processes may return to the step S201 when a determination is made that there is no suddenly-decelerating vehicle.

When a determination is made that there is the suddenly-decelerating vehicle, the flow of the processes may proceed to step S204. In the step S204, the driving support controller 5 may make a determination as to whether the average position error a∆P of the suddenly-decelerating vehicle is recorded in the RAM. When a determination is made that the average position error a∆P of the suddenly-decelerating vehicle is recorded in the RAM, the flow of the processes may proceed to step S205. In the step S205, the driving support controller 5 may make a determination as to whether the elapse of time from the recorded date and time of that average position error a∆P is within a certain time period. This is equivalent to making a determination as to whether the elapse of time, from the time point at which the surrounding vehicle is no longer detected by the autonomous sensor, is within a certain time period. The surrounding vehicle determined as being no longer detected here is the surrounding vehicle for which the average position error a∆P has been calculated.

When a determination is made that the elapse of time from the recorded date and time of that average position error a∆P is within the certain time period, the flow of the processes may proceed to step S206. In the step S206, the driving support controller 5 may adjust the average position error a∆P, based on the elapse of time from the recorded date and time. In subsequent step S207, the driving support controller 5 may set the position of the suddenly-decelerating vehicle to the position that is specified based on the received position information and corrected by the average position error a∆P. Note that the driving support control in this implementation may handle the position of the surrounding vehicle on the basis of the relative position. Hence, the received position information may be converted into the information on the relative position, and the correction performed in the step S207 may then be performed on the converted position information.

The flow of the processes to be performed by the driving support controller 5 may proceed to step S209 upon execution of the correction process of the step S207.

When the average position error a∆P of the suddenly-decelerating vehicle is not recorded in the RAM in the previous step S204 or when the elapse of time from the recorded date and time is not within the certain time period, the flow of the processes may proceed to step S208. In the step S208, the driving support controller 5 may set the position of the suddenly-decelerating vehicle to the position specified based on the received position information. In this implementation, without limitation, the driving support controller 5 may set the position of the suddenly-decelerating vehicle to the converted relative position. Following the setting of the position of the suddenly-decelerating vehicle, the flow of the processes may proceed to the step S209.

In the step S209, the driving support controller 5 may make a determination as to whether the suddenly-decelerating vehicle is present on the same driving lane as the driving lane on which the own vehicle travels. When a determination is made that the suddenly-decelerating vehicle is present on the same driving lane as the driving lane on which the own vehicle travels, the flow of the processes may proceed to step S210. In the step S210, the driving support controller 5 may execute a process of providing a driver with the alert as described above. Following the execution of the alerting process, the flow of the processes may return to the step S201.

When a determination is made that the suddenly-decelerating vehicle is not present on the same driving lane as the driving lane on which the own vehicle travels, the flow of the processes may proceed to step S211. In the step S211, the driving support controller 5 may execute a process of providing the driver with the information as described above. Following the execution of the information provision process, the flow of the processes may return to the step S201.

In the foregoing implementation, described is a non-limiting example in which the determination is made, based on the uncorrected position information, as to whether the suddenly-decelerating vehicle is present on the same driving lane as the driving lane on which the own vehicle travels, and in which the driving support control is executed that is based on the control level that reflects a result of that determination. These determination and execution may be performed in a case where the average position error a∆P of the suddenly-decelerating vehicle is not recorded, or in a case where the elapse of time from the recorded date and time is not within the certain time period. For these cases, alternatively, the execution of the alerting process in the step S210 or the execution of the information provision process in the step S211 may be performed, without making the determination as to whether the suddenly-decelerating vehicle is present on the same driving lane as the driving lane on which the own vehicle travels. Alternatively, a process of any driving support control other than the process in the step S210 or the step S211 may be performed.

In the foregoing implementation, described is a non-limiting example in which the adjustment of the average position error a∆P to be used for the correction may be performed based on the elapse of time from the time point at which the identified surrounding vehicle is no longer detected by the autonomous sensor. However, the adjustment may be performed based on a traveling distance (a distance of movement) from the time point at which the identified surrounding vehicle is no longer detected by the autonomous sensor.

Further, in the foregoing implementation, described is a non-limiting example in which the time point at which the identified surrounding vehicle is no longer detected by the autonomous sensor may be the time point at which the average position error a∆P is recorded (i.e., the time point which the error-recorded date and time indicates). However, the time point at which the identified surrounding vehicle is determined as being no longer detected may be any time point, as long as that time point roughly indicates the time point at which the identified surrounding vehicle is no longer detected by the autonomous sensor. Such a time point may be, for example but not limited to, a time point at which the vehicle-to-vehicle communication data is received.

In the foregoing implementation, described is a non-limiting example in which the alerting is performed as the driving control in which the suddenly-decelerating vehicle is present on the same driving lane as the driving lane on which the own vehicle travels. Alternatively, any other support control directed to the danger avoidance may be performed. Such a support control may be, for example but not limited to, increasing a sensitivity of the pre-crash brake control, including, without limitation, easing conditions for activating the pre-crash brake control.

4. Summary of Implementation

The vehicle position detecting apparatus according to the foregoing implementation may include a position measurement unit, a receiver, an identification unit, a position error calculator, and a position corrector. The position measurement unit measures a position of an own vehicle. The autonomous sensor detects a relative position, relative to the own vehicle, of a surrounding vehicle present around the own vehicle. The receiver receives communication data that is sent from the surrounding vehicle and contains position information on a position of the surrounding vehicle measured by the surrounding vehicle. The identification unit performs identification on the surrounding vehicle detected by the autonomous sensor and the surrounding vehicle from which the communication data is sent, based on information on the position of the own vehicle measured by the position measurement unit, information on the relative position detected by the autonomous sensor, and the position information received by the receiver from the surrounding vehicle. The position error calculator calculates, for the surrounding vehicle identified by the identification unit, a difference, as a position error, between a position of the surrounding vehicle specified based on the information on the relative position detected by the autonomous sensor and the position of the surrounding vehicle specified based on the position information received by the receiver. The position corrector performs, based on the position error calculated by the position error calculator, a correction on the position of the surrounding vehicle specified based on the position information received by the receiver, on a condition that the surrounding vehicle identified by the identification unit is no longer detected by the autonomous sensor.

With this configuration, while the relative position of the surrounding vehicle is detected by the autonomous sensor, the position error on the position of that surrounding vehicle, specified based on the information on that relative position by the vehicle-to-vehicle communication, is calculated. When that surrounding vehicle is no longer detected by the autonomous sensor, the correction on the position of that surrounding vehicle specified by the vehicle-to-vehicle communication is performed based on the calculated position error.

Hence, the vehicle position detecting apparatus according to the implementation makes it possible to properly detect the position of the surrounding vehicle that is located outside a detection range of the autonomous sensor, and thereby to allow a driving support system that utilizes the vehicle-to-vehicle communication to operate properly.

The position corrector may average, on a time axis, the position error sequentially calculated for the identified surrounding vehicle, and may perform the correction, based on the averaged position error.

This makes it possible to remove any noise component, i.e., a component that varies easily and frequently, related to the position error attributed to, for example but not limited to, the insufficient accuracy of the GPS measurement in the surrounding vehicle and the insufficient detection accuracy of the autonomous sensor in the own vehicle. This in turn makes it possible to extract any characteristic component, i.e., a component that less frequently varies, related to the position error attributed to, for example but not limited to, the position at which the GPS antenna is mounted and characteristics of the GPS receiver in the surrounding vehicle.

Hence, it is possible to more properly correct the position of the surrounding vehicle, and thereby to allow the driving support system that utilizes the vehicle-to-vehicle communication to operate more properly.

The position corrector may adjust the position error used for the correction, based on one of an elapse of time from and a traveling distance from a time point at which the identified surrounding vehicle is no longer detected by the autonomous sensor.

This makes it possible to weaken a degree of the correction in accordance with a degree of a change in the traveling environment, and thereby to address situations where the position error may vary in response to the change, from the time point at which the surrounding vehicle is no longer detected by the autonomous sensor, in the traveling environment.

Hence, it is possible to reduce a possibility that the execution of the correction turns out to be a cause of the erroneous detection of the position of the surrounding vehicle, and thereby to allow the driving support system that utilizes the vehicle-to-vehicle communication to operate properly.

A driving support controller may be further included that may perform a driving support control on the own vehicle, based on the position of the surrounding vehicle corrected by the position corrector.

This makes it possible to properly correct the position of the surrounding vehicle that is located outside the detection range of the autonomous sensor, and thereby to allow the driving support system that utilizes the vehicle-to-vehicle communication to operate properly.

The driving support controller may perform the driving support control that is based on any of control levels that are different depending on the position of the surrounding vehicle.

This makes it possible to properly perform the driving support control that is based on the control level that reflects the position of the surrounding vehicle, e.g., based on whether the surrounding vehicle is present on the same driving lane as the driving lane on which the own vehicle travels.

5. Modification Examples

Although some implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

For example, in the foregoing implementation, described is a non-limiting example in which a sensor that uses the cameras is given as an example of the autonomous sensor. The autonomous sensor is, however, not limited thereto. In a modification example, any other sensor such as, but not limited to, a sensor that uses a millimeter-wave radar may be uses as the autonomous sensor.

The invention claimed is:

1. A vehicle position detecting apparatus, comprising:
a position measurement unit that measures a position of a first vehicle as an own vehicle to obtain first position information as position information of the first vehicle;
an autonomous sensor that detects a relative position, relative to the first vehicle, of a second vehicle to obtain relative position information of the second vehicle, the second vehicle being a vehicle different from the first vehicle;
a receiver that receives communication data obtained by the second vehicle and sent from the second vehicle, the communication data containing a second position information, as a position information of the second vehicle; and
a processor, configured to:
identify the second vehicle specified based on the relative position information and the second vehicle from which the communication data is sent, based on the first position information, the relative position information, and the second position information,
determine, for the second vehicle, a difference, as a position error, between a position of the second vehicle specified based on the relative position information and a position of the second vehicle specified based on the second position information,
correct, based on the position error, the position of the second vehicle specified based on the second position information, on a condition that the second vehicle is no longer detected by the autonomous sensor,
average, on a time axis, the position error sequentially calculated for the second vehicle, and
correct the position of the second vehicle, based on an averaged position error.

2. The vehicle position detecting apparatus according to claim 1, wherein the processor is further configured to adjust the position error, based on one of an elapse of time from and a traveling distance of the second vehicle from a time point at which the second vehicle is no longer detected by the autonomous sensor.

3. The vehicle position detecting apparatus according to claim 2, wherein the processor performs a driving support control on the first vehicle, based on a corrected position of the second vehicle.

4. The vehicle position detecting apparatus according to claim 3, wherein the processor performs the driving support control based on any of control levels that are different depending on a traveling position of the second vehicle.

5. The vehicle position detecting apparatus according to claim 1, wherein the processor is configured to adjust the position error, based on one of an elapse of time from and a traveling distance of the second vehicle from a time point at which the second vehicle is no longer detected by the autonomous sensor.

6. The vehicle position detecting apparatus according to claim 5, wherein the processor performs a driving support control on the first vehicle, based on a corrected position of the second vehicle.

7. The vehicle position detecting apparatus according to claim 6, wherein the processor performs the driving support control based on any of control levels that are different depending on a traveling position of the second vehicle.

8. The vehicle position detecting apparatus according to claim 1, wherein the processor performs a driving support control on the first vehicle, based on a corrected position of the second vehicle.

9. The vehicle position detecting apparatus according to claim 8, wherein the processor performs the driving support control based on any of control levels that are different depending on a traveling position of the second vehicle.

10. The vehicle position detecting apparatus according to claim 1, wherein the processor performs a driving support control on the first vehicle, based on a corrected position of the second vehicle.

11. The vehicle position detecting apparatus according to claim 10, wherein the processor performs the driving support control based on any of control levels that are different depending on a traveling position of the second vehicle.

* * * * *